United States Patent
Che et al.

(10) Patent No.: US 9,136,998 B2
(45) Date of Patent: Sep. 15, 2015

(54) OPTIMIZED UPLINK CONTROL SIGNALING FOR EXTENDED BANDWIDTH

(75) Inventors: Xiang Guang Che, Beijing (CN); Esa Tirrola, Kempele (FI); Kari Pajukoski, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 410 days.

(21) Appl. No.: 13/120,475

(22) PCT Filed: Sep. 23, 2009

(86) PCT No.: PCT/IB2009/006945
§ 371 (c)(1),
(2), (4) Date: Oct. 13, 2011

(87) PCT Pub. No.: WO2010/035117
PCT Pub. Date: Apr. 1, 2010

(65) Prior Publication Data
US 2012/0093097 A1    Apr. 19, 2012

Related U.S. Application Data

(60) Provisional application No. 61/194,042, filed on Sep. 23, 2008.

(51) Int. Cl.
*H04L 5/00* (2006.01)
*H04W 72/04* (2009.01)

(52) U.S. Cl.
CPC ............. *H04L 5/0055* (2013.01); *H04L 5/001* (2013.01); *H04L 5/0053* (2013.01); *H04L 5/0092* (2013.01); *H04W 72/0413* (2013.01); *H04W 72/042* (2013.01)

(58) Field of Classification Search
CPC .............................. H04W 72/04; H04L 12/66
USPC .................................................. 370/328–338
See application file for complete search history.

(56) References Cited

U.S. PATENT DOCUMENTS

2005/0208961 A1*  9/2005  Willenegger ................. 455/522
2006/0203779 A1   9/2006  Attar et al.
(Continued)

FOREIGN PATENT DOCUMENTS

WO    2006/113633 A2   10/2006
WO    2006113633       10/2006

OTHER PUBLICATIONS

Office Action received for corresponding European Application No. 09815741.5-1858, dated Mar. 27, 2013, 6 pages.
(Continued)

*Primary Examiner* — Brandon Renner
(74) *Attorney, Agent, or Firm* — Squire Patton Boggs (US) LLP

(57) ABSTRACT

According to an embodiment a user equipment UE transmits uplink control signals using one or more chunks of uplink frequency spectrum that contain a simultaneous uplink shared channel; and for the case where there is no simultaneous uplink shared channel available, the UE transmits uplink control signals using only a single chunk of uplink frequency spectrum. In various embodiments the control signals are ACK/NACK control signals transmitted on an uplink control channel, the uplink shared channel comprises a chunk-specific uplink control channel, and each chunk comprises a component carrier of a LTE-A system. Downlink assignment index bits may be included in a downlink grant to the UE which indicates how many chunks in total are allocated in a current downlink subframe. The UE can also use ACK/NACK control signal bundling over chunks in addition to either or both of chunk-specific ACK/NACK control signals or ACK/NAK control signal multiplexing.

17 Claims, 6 Drawing Sheets

(56) References Cited

U.S. PATENT DOCUMENTS

| | | | |
|---|---|---|---|
| 2006/0229091 A1 | 10/2006 | Rezaiifar et al. | |
| 2007/0258540 A1* | 11/2007 | Ratasuk et al. | 375/267 |
| 2008/0101441 A1* | 5/2008 | Palanki et al. | 375/146 |
| 2008/0253318 A1* | 10/2008 | Malladi et al. | 370/328 |
| 2009/0080500 A1* | 3/2009 | Muharemovic et al. | 375/146 |
| 2009/0203323 A1* | 8/2009 | Ratasuk et al. | 455/68 |
| 2009/0221289 A1* | 9/2009 | Xu et al. | 455/435.1 |
| 2010/0135273 A1* | 6/2010 | Kim | 370/344 |

OTHER PUBLICATIONS

"UL Control Signalling to Support Bandwidth Extension in LTE-Advanced", 3GPP TSG RAN WG1 Meeting #56, R1-090724, Agenda Item: 12.1, Feb. 9-13, 2009, 5 pages.

"UL Control Signalling for Carrier Aggregation", 3GPP TSG RAN WG1 Meeting #57bis, R1-092572, Agenda Item: 15.4, Jun. 29-Jul. 3, 2009, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, v8.5.0, May 2008, pp. 1-134.

"3rd Generation Partnership Project; Technical Specification Group Radio Access Network; Requirements for Further Advancements for E-UTRA (LTE-Advanced) (Release 8)", 3GPP TS 36.913, v8.0.0, Jun. 2008, pp. 1-14.

"3rd Generation Partnership Project; Technical Specification Group Radio Access Network; Evolved Universal Terrestrial Radio Access (E-UTRA); Physical Channels and Modulation (Release 8)", 3GPP TS 36.211, v8.3.0, May 2008, pp. 1-77.

International Search Report received for corresponding Patent Cooperation Treaty Application No. PCT/IB2009/006945, issued Feb. 8, 2010, 19 pages.

"Transmission of ACK/NAK on PUSCH for LTE TDD", TSG-RAN WG1 #54, R1-083371, Agenda Item: 6.3, Aug. 18-22, 2008, 6 pages.

"Single-Carrier Based Multiplexing of Uplink L1/L2 Control Channel", 3GPP TSG RAN WG1 LTE Ad Hoc, R1-061674, Agenda Item: 6.3.3, Jun. 27-30, 2006, pp. 1-9.

"Way Forward on Multiple ACK/NAKs for LTE TDD", 3GPP TSG-RAN WG1 #53bis, R1-082752, Agenda Item: 6.3, Jun. 30-Jul. 4, 2008, 5 pages.

"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331, v9.4.0, Sep. 2010, pp. 1-252.

"Introduction of Rel-10 LTE-Advanced Features in 36.211", 3GPP TSG-RAN Meeting #63, Draft Change Request, R1-106448, v9.1.0, Nov. 15-19, 2010, pp. 1-98.

"Introduction of Rel-10 LTE-Advanced Features in 36.212", 3GPP TSG-RAN Meeting #63, Draft Change Request, R1-106449, v9.3.0, Nov. 15-19, 2010, pp. 1-69.

"Introduction of Rel-10 LTE-Advanced Features in 36.213", 3GPP TSG-RAN Meeting #63, Draft Change Request, R1-106450, v9.2.0, Nov. 15-19, 2010, pp. 1-92.

"Capturing of Further Agreements on Relaying", 3GPP TSG-RAN WG1 Meeting #63, Change Request, R1-106478, v10.0.0, Nov. 15-19, 2010, pp. 1-12.

Extended European Search Report received for corresponding European Patent Application No. 09815741.5, issued Aug. 14, 2012, 6 pages.

Office Action received for corresponding Chinese Application No. 20090143463.0, dated Jun. 13, 2013, 8 pages.

Chinese Office Action dated Aug. 4, 2014, for corresponding Chinese Patent Application No. 200980143463.0.

Office Action dated Mar. 7, 2014, issued in corresponding CN Patent Application No. 200980143463.0.

Office Communication dated Feb. 28, 2014, issued in corresponding EP Patent Application No. 09 815 741.5.

3GPP TSG RAN WG1 #54, "Multiple ACK/NAK Transmission in TDD" Texas Instruments, Jeju, South Korea (Aug. 18-22, 2008).

* cited by examiner

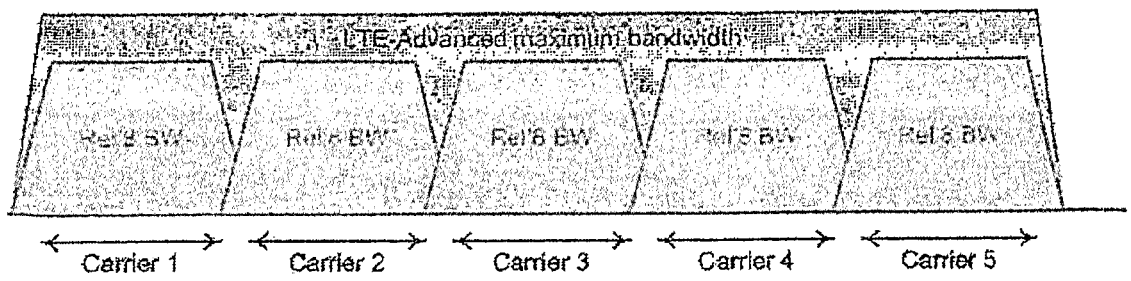
Figure 1. Bandwidth extension principle used in LTE-A.
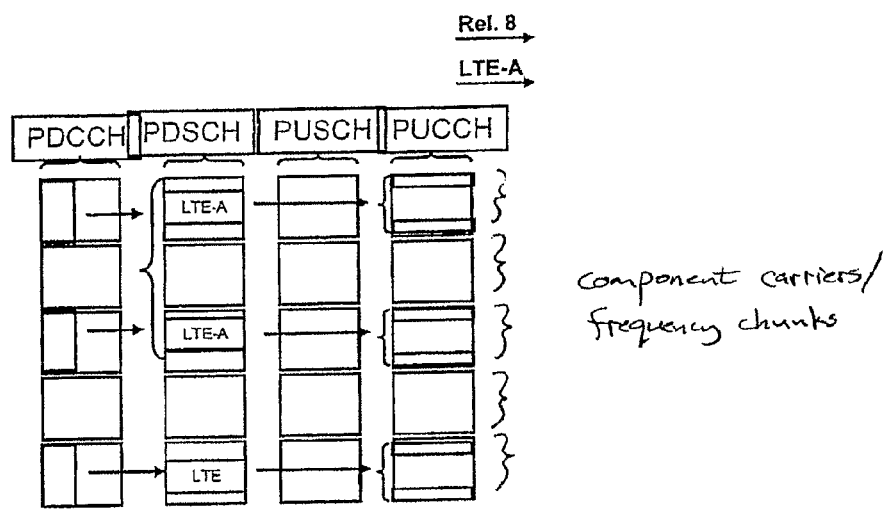
Figure 2. UL/DL arrangement, 2xDL.

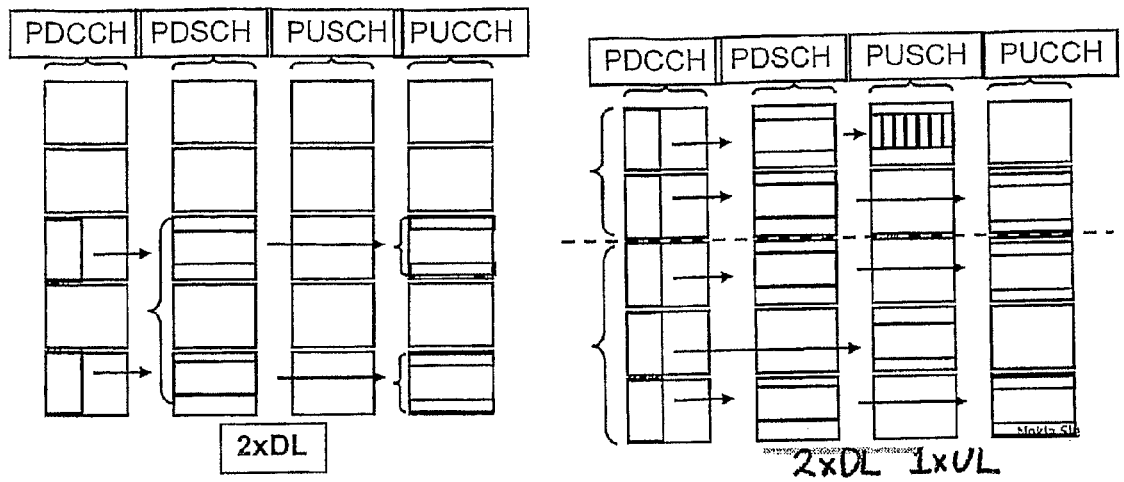
Figure 3. Different UL/DL configurations.
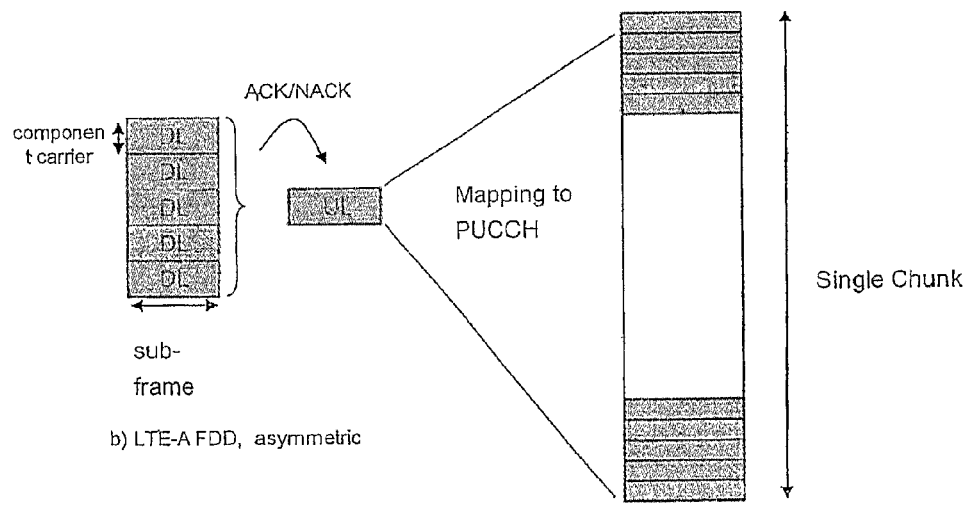
b) LTE-A FDD, asymmetric
Figure 6. Proposed PUCCH resource mapping for LTE-A FDD, asymmetric UL/DL allocation.

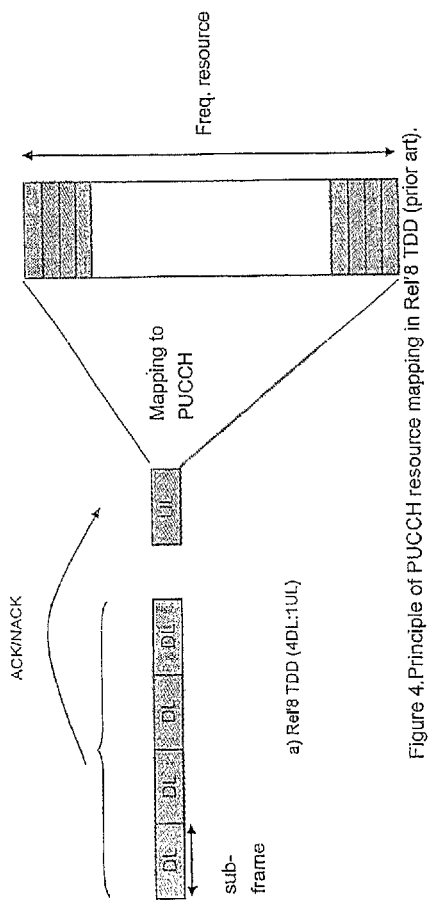
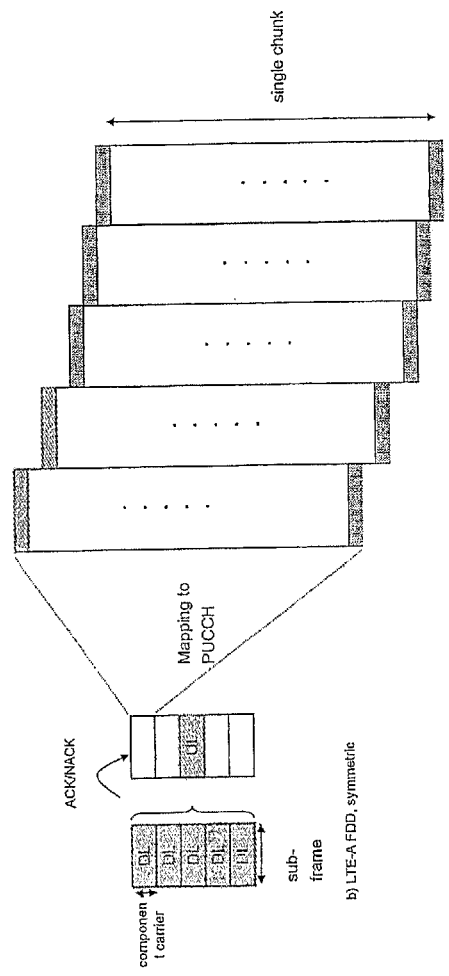
Figure 4. Principle of PUCCH resource mapping in Rel'8 TDD (prior art).
Figure 5. Proposed PUCCH resource mapping for LTE-A FDD, symmetric UL/DL allocation.

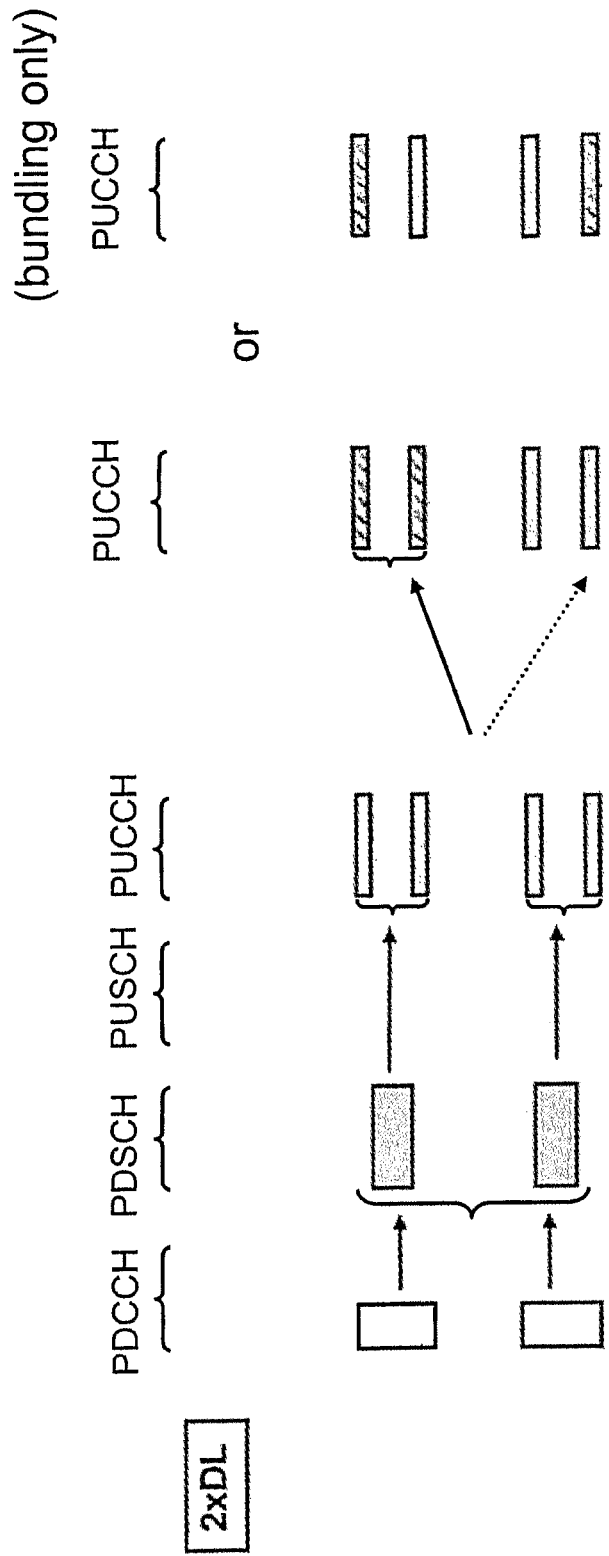
Figure 7: Preferred physical layer arrangement for bundled ACK/NACK

OPTIMIZED UPLINK CONTROL SIGNALING FOR EXTENDED BANDWIDTH

RELATED APPLICATION

This application was originally filed as PCT Application No. PCT/IB2009/006945 filed on Sep. 23, 2009 and claims priority to U.S. Provisional Application No. 61/194,042 filed on Sep. 23, 2008, which is incorporated herein by reference in its entirety.

TECHNICAL FIELD

The exemplary and non-limiting embodiments of this invention relate generally to wireless communication systems, methods, devices and computer programs and, more specifically, relate to signaling, such as control channel signaling, between a mobile communication node and a network access node.

BACKGROUND

Various abbreviations that appear in the specification and/or in the drawing figures are defined as follows:
3GPP third generation partnership project
ACK acknowledge
BW bandwidth
CCE control channel element
CDM code division multiplexing
CM cubic metric (measure of peak-to-average ratio of a signal)
DAI downlink assignment index
DL downlink (eNB towards UE)
eNB EUTRAN Node B (evolved Node B)
EPC evolved packet core
EUTRAN evolved UTRAN (LTE)
FDD frequency division duplex
FDMA frequency division multiple access
HARQ hybrid automatic repeat request
HO handover
ITU international telecommunications union
LTE long term evolution
LTE-A LTE-advanced
MAC medium access control
MM mobility management
MME mobility management entity
NACK not (negative) acknowledge
Node B base station
O&M operations and maintenance
OFDMA orthogonal frequency division multiple access
PDCCH physical downlink control channel
PDCP packet data convergence protocol
PDU protocol data unit
PHY physical layer
PRB physical resource block
PUCCH physical uplink control channel
PUSCH physical uplink shared channel
QPSK quadrature phase shift keying
RAN radio access network
Rel-8 LTE Release 8
RLC radio link control
RRC radio resource control
RRM radio resource management
SC-FDMA single carrier, frequency division multiple access
SDU service data unit
S-GW serving gateway
TDD time division duplex
TTI transmission time interval
UE user equipment
UL uplink (UE towards eNB)
UTRAN universal terrestrial radio access network
ZAC zero-autocorrelation (computer-search based reference signal sequences used in UL)

The specification of a communication system known as evolved UTRAN (E-UTRAN, also referred to as UTRAN-LTE or as E-UTRA) is nearing completion within 3GPP. In this system the DL access technique will be OFDMA and the UL access technique will be SC-FDMA.

One specification of interest is 3GPP TS 36.300, V8.5.0 (2008-05), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is attached to the priority document U.S. Provisional Patent Application No. 61/194,042 (filed Sep. 23, 2008) as Exhibit A.

In general, the set of specifications given generally as 3GPP TS 36.xyz (e.g., 36.311, 36.312, etc.) may be seen as describing the entire Release-8 LTE system.

FIG. 8 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configuration for mobility and scheduling.

Of even greater interest herein is the evolution of LTE Rel-8 to Rel-9 and beyond, including LTE-A, and more specifically the UL/DL control channel arrangement in the LTE-A system. These further releases of 3GPP LTE are targeted towards future IMT-A systems, referred to for convenience simply as LTE-A. Of additional interest herein are local area (LA) deployment scenarios using a scalable bandwidth (of up to, for example, 100 MHz) with flexible spectrum use (FSU).

Reference can also be made to 3GPP TR 36.913, V8.0.0 (2008-06), 3rd Generation Further Advancements for E-UTRA (LTE-Advanced) (Release 8), attached to the above-referenced priority document as Exhibit B.

LTE-A will be an evolution of LTE Rel-8 system fulfilling the ITU-R requirements for IMT-Advanced. One of the main assumptions made by 3GPP is related to backwards compatibility:

a Release 8 E-UTRA terminal must be able to work in an Advanced E-UTRAN; and an advanced E-UTRA terminal can work in a Release 8 E-UTRAN.

In order to meet the backwards compatibility requirements, carrier aggregation is being considered as the method to extend the bandwidth in LTE-A system. The principle of carrier aggregation is shown in FIG. 1 (N×LTE Rel-8 BW).

Channel aggregation as shown in FIG. 1 can be seen as multi-carrier extension of LTE Rel-8. From the UL/DL control signaling point of view, the most straightforward multi-carrier concept is just to duplicate the existing Rel-8 control plane (PDCCH, PUCCH, . . . ) to each component carrier (or chunk). The principle of this approach is illustrated in FIG. 2, which shows an example of UL/DL control/data arrangement in the following use case:

one Rel-8 UE being allocated into one of the component carriers (1xPDCCH, 1xPUCCH); and one LTE-A UE having DL allocation in two different component carriers (2xPDCCH, 2xPUCCH).

There are clear advantages related to this type of control signaling arrangement, including minimal standardization impact, support for non-continuous frequency spectrum, support for variable size component carriers and automatic support for frequency domain link adaptation and HARQ per component carrier However, and as will be discussed in greater detail below, at least some problems that arise with this type of signaling arrangement relate to UL operation. The issue that is presented is how to best optimize the UL control signaling in the case when multiple component carriers are scheduled for a single UE.

SUMMARY

The foregoing and other problems are overcome, and other advantages are realized, by the use of the exemplary embodiments of this invention.

In a first aspect thereof the exemplary embodiments of this invention provide a method comprising: transmitting from an apparatus uplink control signals using one or more chunks of uplink frequency spectrum that contain a simultaneous uplink shared channel; and for the case where there is no simultaneous uplink shared channel available, transmitting from the apparatus uplink control signals using only a single chunk of uplink frequency spectrum.

In a second aspect thereof the exemplary embodiments of this invention provide a method comprising: receiving at an apparatus data signals on a downlink shared channel using one or more chunks of downlink frequency spectrum and; transmitting from the apparatus uplink control signals corresponding to the downlink shared channel of each of the received chunks of downlink frequency spectrum, wherein only a single uplink control channel resource on a single chunk of uplink frequency spectrum at a time is used for the transmission of the uplink control signals.

In a third aspect thereof the exemplary embodiments of this invention provide an apparatus comprising at least a controller and a transmitter which is configured to: transmit uplink control signals using one or more chunks of uplink frequency spectrum that contain a simultaneous uplink shared channel; and for the case where there is no simultaneous uplink shared channel available the transmitter is configured to transmit uplink control signals using only a single chunk of uplink frequency spectrum.

In a fourth aspect thereof the exemplary embodiments of this invention provide an apparatus comprising: a receiver configured to receive data signals on a downlink shared channel using one or more chunks of downlink frequency spectrum; and a transmitter configured to transmit uplink control signals corresponding to the downlink shared channel of each of the received chunks of downlink frequency spectrum, wherein only a single uplink control channel resource on a single chunk of uplink frequency spectrum at a time is used for the transmission of the uplink control signals.

In a fifth aspect thereof the exemplary embodiments of this invention provide a memory storing a program of computer-readable instructions. When executed by a processor, the stored instructions cause the processor to perform actions comprising: transmitting uplink control signals using one or more chunks of uplink frequency spectrum that contain a simultaneous uplink shared channel; and for the case where there is no simultaneous uplink shared channel available, transmitting uplink control signals using only a single chunk of uplink frequency spectrum.

In a sixth aspect thereof the exemplary embodiments of this invention provide a memory storing a program of computer-readable instructions which when executed by a processor cause the processor to perform actions. In this aspect the actions comprise: receiving data signals on a downlink shared channel using one or more chunks of downlink frequency spectrum; and transmitting uplink control signals corresponding to the downlink shared channel of each of the received chunks of downlink frequency spectrum, wherein only a single uplink control channel resource on a single chunk of uplink frequency spectrum at a time is used for the transmission of the uplink control signals.

In a seventh aspect thereof the exemplary embodiments of this invention provide an apparatus comprising at least processing means and transmitting means. The transmitting means is for transmitting uplink control signals using one or more chunks of uplink frequency spectrum that contain a simultaneous uplink shared channel; and for the case where there is no simultaneous uplink shared channel available the transmitting means is for transmitting uplink control signals using only a single chunk of uplink frequency spectrum.

In an eighth aspect thereof the exemplary embodiments of this invention provide an apparatus comprising: receiving means for receiving data signals on a downlink shared channel using one or more chunks of downlink frequency spectrum and; transmitting means for transmitting uplink control signals corresponding to the downlink shared channel of each of the received chunks of downlink frequency spectrum, wherein only a single uplink control channel resource on a single chunk of uplink frequency spectrum at a time is used for the transmitting of the uplink control signals.

BRIEF DESCRIPTION OF THE DRAWINGS:

In the attached Drawing Figures:

FIG. 1 illustrates a bandwidth extension principle used in LTE-A.

FIG. 2 shows an example of a LTE-A UL/DL arrangement for NxDL, where N=2.

FIG. 3 shows examples of various UL/DL configurations for 2xDL and 2xUL and DL cases.

FIG. 4 shows the conventional principle of PUCCH resource mapping in Rel-8 TDD.

FIG. 5 shows an exemplary PUCCH resource mapping for LTE-A FDD, symmetric UL/DL allocation in accordance with the exemplary embodiments of this invention.

FIG. 6 shows an exemplary PUCCH resource mapping for LTE-A FUD, asymmetric UL/DL allocation in accordance with the exemplary embodiments of this invention.

FIG. 7 shows a physical layer arrangement for bundled ACK/NACK in accordance with the exemplary embodiments of this invention.

DETAILED DESCRIPTION:

Based on the foregoing it may be appreciated that the conventional approach would be to maintain the UL control signaling unchanged in LTE-A as compared to LTE Rel-8, i.e., to simply copy the PUCCH/PUSCH for each component carrier and to keep them separated.

However, there are clear disadvantages related to this approach. First, it should be noted that multi-carrier transmission is realized whenever UL/DL resources are allocated into different portions or "chunks" or "component carriers" of spectrum. Various multi-carrier configurations may take place (based on UL/DL scheduling decisions) as seen in FIG. 3. Sufficient scheduler flexibility with respect to allocation of UL/DL resources on different component carriers should be allowed. At the same time, from the UL control channel coverage point of view single carrier transmission should be the target whenever possible (to minimize the CM). Furthermore, note that the CM can be very high (even larger than with OFDM) in the case where different ZAC sequences are used on the different component carriers.

It is also noted that multi-bit ACK/NACK transmission is realized when more than one DL chunk is being allocated. UL coverage is an issue with multi-bit ACK/NACK. Therefore, ACK/NACK bundling should be an option (similarly as in Rel-8 TDD). Performance of ACK/NACK signaling is not optimized with conventional signaling, as chunk-specific, multi-bit ACK/NACK signaling is performed without the use of channel coding.

Figure 8:
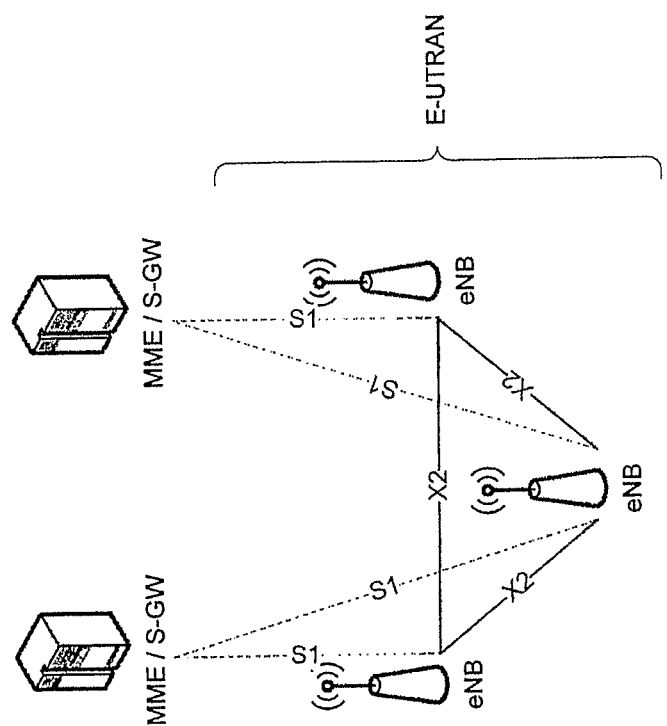
FIG. 8 reproduces FIG. 4 of 3GPP TS 36.300, and shows the overall architecture of the E-UTRAN system.
Figure 9:
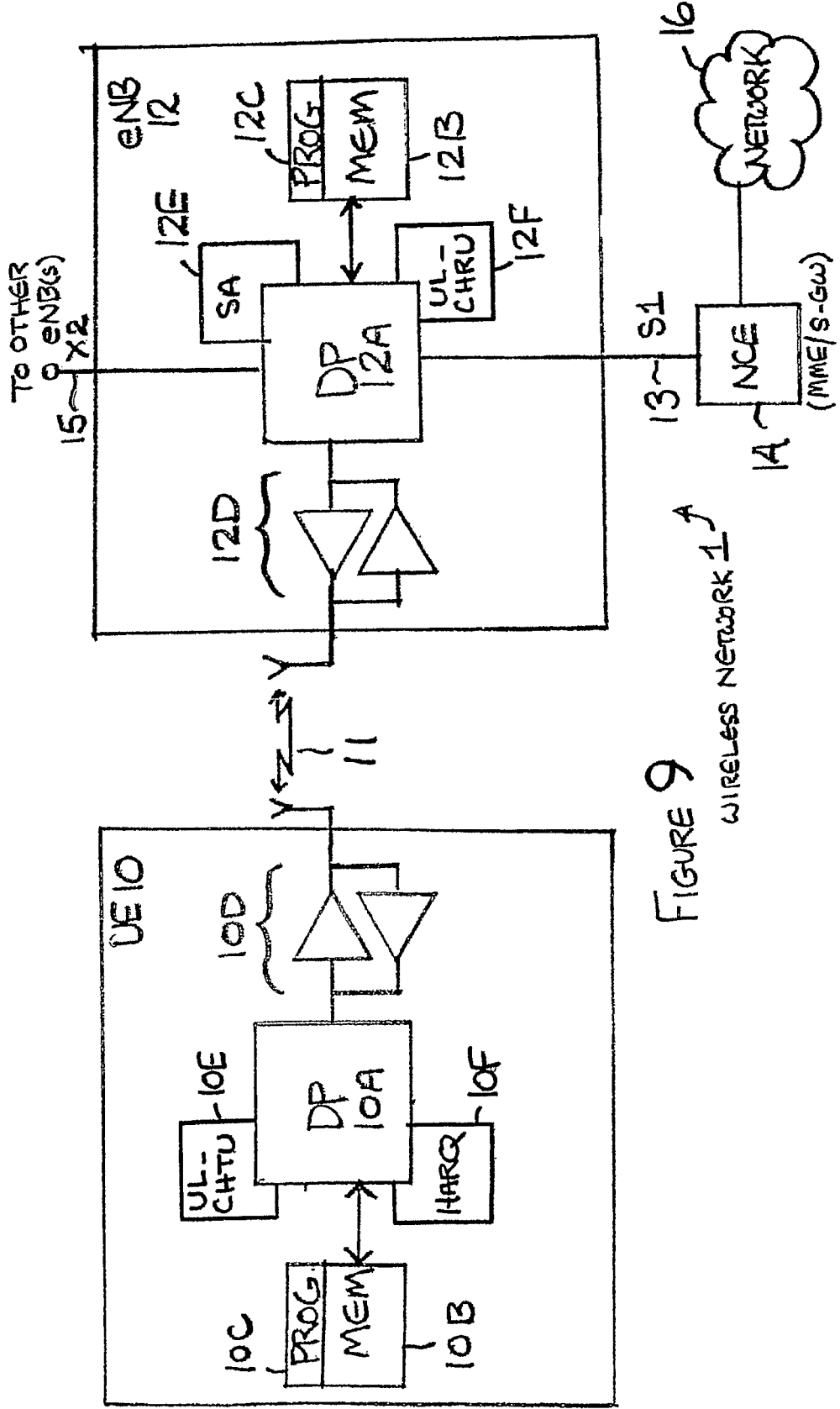
FIG. 9 shows a simplified block diagram of various electronic devices that are suitable for use in practicing the exemplary embodiments of this invention.

Before describing in further detail the exemplary embodiments of this invention, reference is made to FIG. 9 for illustrating a simplified block diagram of various electronic devices and apparatus that are suitable for use in practicing the exemplary embodiments of this invention. In FIG. 9 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 8, and which provides connectivity with a network 16, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data / control path 13 to the NCE 14. The path 13 may be implemented as the S1 interface shown in FIG. 8. The eNB 12 may also be coupled to one or more other eNBs 12 via a path 15, which may implement the X2 interface shown in FIG. 8.

At least one of the PROGs 10C and 12C is assumed to include program instructions that, when executed by the associated DP, enable the electronic device to operate in accordance with the exemplary embodiments of this invention, as will be discussed below in greater detail. That is, the exemplary embodiments of this invention may be implemented at least in part by computer software executable by the DP 10A of the UE 10 and by the DP 12A of the eNB 12, or by hardware, or by a combination of software and hardware.

Typically there will be a plurality of UEs 10 serviced by the eNB 12. The UEs 10 may or may not be identically constructed, but in general are all assumed to be electrically and logically compatible with the relevant network protocols and standards needed for operation in the wireless network 1.

For the purposes of describing the exemplary embodiments of this invention the UE 10 may be assumed to also include an UL control channel transmission unit (UL_CHTU) 10E and a HARQ unit 10F that functions at least in part to generate ACK/NACK signaling bits, and the eNB 12 includes a spectrum allocation (SA) unit 12E as well as an UL control channel reception unit (UL_CHRU) 12F. These various units, which may be implemented as hardware, software and/or firmware, as well as in one more integrated circuit embodiments, operate in accordance with the exemplary embodiments of this invention as described in further detail below.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on multicore processor architectures, as non-limiting examples.

The exemplary embodiments of this invention provide an arrangement to minimize the CM properties of UL control/data signals in the case where chunk-specific PDCCH control signaling is used in the LTE-A DL. The minimized CM properties are achieved by means of pre-determined rules implemented by the UE 10 and eNB 12, more specifically rules that are shared between the UL_CHTU 10E and the UL_CHRU 12F. Certain high level rules may be expressed as follows:

I. Whenever possible, transmit UL control signals using the chunk(s) containing the simultaneous PUSCH (NxDL+ NxUL).

II. If there is no simultaneous PUSCH available then transmit UL control signals via a single chunk/single resource as opposed to multiple chunks/multiple resources (NxDL).

When signaling ACK/NACK in LTE-A, the Rel-8 TDD-related UL/DL control signaling is modified according to the principle shown in FIG. 4 (conventional) as shown in FIG. 5, i.e., from the ACK/NACK signaling point of view the component carriers are considered as TDD subframes. FIG. 5 shows the principle in the case where the number of component carriers in the UL and DL direction is the same. FIG. 5 illustrates the case without the simultaneous PUSCH available. In this case the multi-bit ACK/NACK feedback is transmitted via single component carriers, instead of multiple component carriers. The used ACK/NACK channel may be based on the ACK/NACK feedback.

In the case when more than one UL chunk is available (PUSCH has been granted for multiple chunks), UL control signals may be transmitted via all granted UL chunks. Alternatively, it is within the scope of these exemplary embodiments to use only dedicated UL chunk(s) for UL control signaling.

The use of these exemplary embodiments is applicable for both symmetric and asymmetric spectrum allocations, and UL/DL allocations as well. However, the mapping from PDCCH→PDSCH→PUCCH shown in FIG. 5 is intended for symmetric UL/DL spectrum allocation. In this context a symmetric UL/DL spectrum allocation implies that the number of DL chunks is equal to the number of UL chunks.

The mapping of PDCCH→PDSCH→PUCCH for asymmetric UL/DL spectrum allocation is somewhat different in the sense that PUCCH (ACK/NACK) resources corresponding to different DL chunks are not necessary on separate UL chunks. In this context an asymmetric UL/DL spectrum allocation implies that the number of DL chunks is not equal to the number of UL chunks. FIG. 6 illustrates the foregoing principle with an asymmetric UL/DL spectrum allocation. Note that while FIG. 6 assumes as a non-limiting example a case of 5DLx1UL, the underlying inventive principle may be extended to any asymmetric UL/DL spectrum allocations, e.g., 4DLx1UL, 3DLx1UL, 4DLx2UL, etc.

The following extensions to the LTE-A FDD control signaling may be made in accordance with these exemplary embodiments.

DAI (downlink assignment index) bits may be included in DL grants in order to solve a problem that can arise related to DL grant failure. In addition to a TDD specific interpretation (i.e., counting the number of allocated subframes), an additional interpretation of the DAI may be used and, different than Rel-8 TDD, DAI in LTE-A is used to indicate how many chunks in total are allocated in the current DL subframe (and may vary subframe to subframe).

The DAI bits may also be included in UL grants in order to solve the problem related to DL grant failure when simultaneous PUSCH occur.

ACK/NACK bundling over chunks is supported in addition to chunk-specific ACK/NACK (or ACK/NAK multiplexing) to provide a tradeoff between DL throughput and the ACK/NACK coverage in the UL.

Discussed now with regard to FIG. 7 is an example of ACK/NACK bundling on the LTE-A PUCCH. FIG. 7 shows an example of a physical layer arrangement for the LTE-A PUCCH, where the bundled ACK/NACK is transmitted using the outermost PUCCH resources only. One technical effect of this arrangement is to increase/maximize the frequency diversity.

With regard to a specific example for multi-bit ACK/NACK (e.g., 5 bits) on the LTE-A PUCCH, a most basic approach is to modify/extend the Rel-8 TDD ACK/NAK multiplexing on the PUCCH, which is PUCCH format 1b, with channel selection supporting up to a 4-bit ACK/NAK. Several non-limiting examples are listed below.

Reference with regard to Rel-8 PUCCH format 1b can be made to 3GPP TS 36.211 V8.3.0 (2008-05) Technical Specification 3rd Generation Partnership Project; Technical Specification Group Radio Access Network; Evolved Universal Terrestrial Radio Access (E-UTRA); Physical Channels and Modulation (Release 8), attached to the above-referenced priority document as Exhibit C. See, for example, subclause 5.4, Physical uplink control channel.

In one embodiment there is allocated more than one CCE per chunk-specific PDCCH so that more than one PUCCH ACK/NAK resource is available per chunk. For example, at least with two CCEs for each chunk-specific PDCCH are allocated, where the first two CCEs have dedicated ACK/NACK resources on the PUCCH, so that there are up to 4×5×2=40 PUCCH ACK/NAK constellation points (4 constellation points per PUCCH channel with format 1b, five chunk-specific PDCCH each have two dedicated PUCCH ACK/NAK channels) which can carry up to five bits ACK/NAK information by channel and constellation point selection.

In another embodiment no additional requirement for CCE allocation per chunk-specific PDCCH is needed, but instead all constellation points are utilized in both slots of one PUCCH subframe for different ACK/NAK information (as opposed to repeating/hopping the same ACK/NAK in two slots of one PUCCH subframe). By so doing there are up to 4×5×2=40 PUCCH ACK/NAK constellation points (four constellation points per slot of PUCCH channel, five chunk-specific PDCCH each have one dedicated PUCCH ACK/NAK channel associated with the first allocated CCE, and each PUCCH ACK/NAK channel contains two slots per subframe) which can carry up to five bits of ACK/NAK information by channel, slot and constellation point selection.

In a further embodiment no additional requirement for CCE allocation per chunk-specific PDCCH is needed. Instead there is performed repetition/hopping transmission over two slots of one PUCCH subframe while making one or more many-to-one mappings of 5-bit ACK/NAK to 20 states (i.e., a type of sub-bundling or ACK/NAK compression between pure multiplexing and pure bundling) to fit within 20 PUCCH ACK/NAK constellation points available from five chunk-specific PDCCH each having one dedicated PUCCH ACK/NAK channel. In this case each channel may have four constellation points, as is the case when QPSK modulation is employed.

The use of these exemplary embodiments provides an improved UL performance while reducing the CM and providing improved control channel coverage.

The changes needed to current PDCCH formats to implement the exemplary embodiments of this invention are minimal (e.g., introducing the DAI bits). It is noted that some modifications to the existing control channel may be needed in any event due to the possible presence of asymmetric UL/DL allocations, i.e., simple copying of Rel-8 PDCCH/PUCCH may not be feasible.

As should be clear, at least one technical effect that is obtained by the use of these exemplary embodiments is the automatic support for various asymmetric UL/DL configurations.

Based on the foregoing it should be apparent that the exemplary embodiments of this invention provide a method, apparatus and computer program(s) to provide enhanced uplink control channel operation in an extended bandwidth type of wireless communication system.

Figure 10:
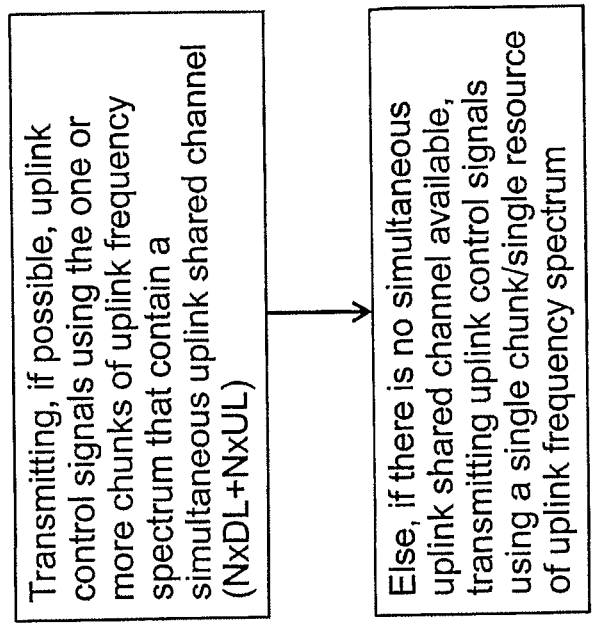
FIG. 10 is a logic flow diagram that illustrates the operation of a method, and a result of execution of computer program instructions, in accordance with the exemplary embodiments of this invention.

FIG. 10 is a logic flow diagram that illustrates the operation of a method, and a result of execution of computer program instructions, in accordance with the exemplary embodiments of this invention. At Block 10A there is a step of, if possible, transmitting uplink control signals using the one or more chunks of uplink frequency spectrum that contain a simultaneous uplink shared channel (NxDL+NxUL); and at block 10B, if there is no simultaneous uplink shared channel available, then transmitting uplink control signals using a single chunk/single radio resource of uplink frequency spectrum.

In the method and computer program of the preceding paragraph, where the control signals comprise ACK/NACK control signals.

In the method and computer program of the preceding paragraphs, where downlink assignment index (DAI) bits may be included in a downlink grant.

In the method and computer program of the preceding paragraph, where the downlink assignment index (DAI) bits indicate how many chunks in total are allocated in a current downlink subframe.

In the method and computer program of the preceding paragraph, where a number of chunks allocated may vary from subframe to subframe.

In the method and computer program of the preceding paragraphs, further comprising the use of ACK/NACK bundling over chunks in addition to chunk-specific ACK/NACK or ACK/NAK multiplexing.

In the method and computer program of the preceding paragraphs, further comprising allocating more than one control channel element per chunk-specific physical downlink control channel so that more than one physical uplink control channel ACK/NAK resource is available per chunk, or utilizing all constellation points in both slots of one physical uplink control channel subframe for different ACK/NAK information, or using repetition/hopping transmission over two slots of one physical uplink control channel subframe while making at least one many-to-one mapping of multi-bit ACK/NAK to some number of physical uplink control channel ACK/NAK constellation points.

In the method and computer program of the preceding paragraphs, further comprising using one of a symmetric or an asymmetric uplink/downlink spectrum allocation.

The various blocks shown in FIG. 10 may be viewed as method steps, and/or as operations that result from operation of computer program code, and/or as a plurality of coupled logic circuit elements constructed to carry out the associated function(s).

That is, these exemplary embodiments also pertain to apparatus embodied at a mobile communication node and comprising at least a transmitter and a controller configured to transmit uplink control signals using one or more chunks of uplink frequency spectrum that contain a simultaneous uplink shared channel (NxDL+NxUL), and further configured, if there is no simultaneous uplink shared channel available, to transmit uplink control signals using a single chunk of uplink frequency spectrum.

In the apparatus of the preceding paragraph, where the control signals comprise ACK/NACK control signals.

In the apparatus of the preceding paragraphs, and further comprising a receiver configured with said controller to receive downlink assignment index bits in a downlink grant, where the downlink assignment index bits indicate how many chunks in total are allocated in a current downlink subframe.

In the apparatus of the preceding paragraph, where a number of chunks allocated may vary from subframe to subframe.

In the apparatus of the preceding paragraphs, where said controller is further configured to use ACK/NACK bundling over chunks, as well as chunk-specific ACK/NACK or ACK/NAK multiplexing.

In the apparatus of the preceding paragraphs, further configured to respond to an allocation of more than one control channel element per chunk-specific physical downlink control channel so that more than one physical uplink control channel ACK/NAK resource is available per chunk, or to utilize all constellation points in both slots of one physical uplink control channel subframe for different ACK/NAK information, or to use repetition/hopping transmission over two slots of one physical uplink control channel subframe while making at least one many-to-one mapping of multi-bit ACK/NAK to some number of physical uplink control channel ACK/NAK constellation points.

In the apparatus of the preceding paragraphs, where there is used one of a symmetric or an asymmetric uplink/downlink spectrum allocation.

It should be also appreciated that these exemplary embodiments apply as well to the network access node that is configured to receive uplink control signaling that is transmitted by the mobile communication node, and to allocate spectrum accordingly as needed.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) and LTE-A systems, it should be appreciated that the exemplary embodiments of this invention are not limited for use with only these particular types of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., ACK/NACK bits, DAI bits, etc.) are not intended to be limiting in any respect, as these parameters may be identified by any suitable names. Further, the various names assigned to different channels (e.g., PUCCH, PDCCH, PUSCH, PDSCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
    receiving at an apparatus data signals on more than one downlink shared channels using more than one chunks of downlink frequency spectrum; and
    transmitting from the apparatus uplink multi-bit acknowledge/not-acknowledge feedback corresponding to the downlink shared channel of each of the chunks of downlink frequency spectrum, wherein a single acknowledge/not-acknowledge channel resource on a single chunk of uplink component carrier at a time is used for the transmission of the multi-bit acknowledge/not-acknowledge feedback;
    wherein selection of the single acknowledge/not-acknowledge channel resource to be used, from a plurality of resources, is based on the multi-bit acknowledge/not-acknowledge feedback.

2. The method according to claim 1, wherein the acknowledge/not-acknowledge (ACK/NACK) control signals are transmitted on an uplink control channel,
    in which each uplink control channel is component-carrier specific, is reserved from at least one uplink component carrier and corresponds to the chunk of downlink frequency spectrum, and each chunk comprises a component carrier.

3. The method according to claim 1, in which downlink assignment index bits are included in a downlink grant which is received at the apparatus on a downlink control channel, the downlink assignment index bits indicating how many chunks in total are allocated in a current downlink subframe;
    in which transmitting the uplink multi-bit acknowledge/not-acknowledge feedback is in response to the data signals received on the downlink shared channel that is allocated to the apparatus by the received downlink grant.

4. The method according to claim 2, further comprising using at least one of:
    ACK/NACK control signal multiplexing including ACK/NACK control signal bundling over a spatial domain; and
    ACK/NACK control signal bundling over a component carrier domain.

5. The method according to claim 2, further comprising utilizing all constellation points in two slots of one physical uplink control channel subframe for different ACK/NACK control signals.

6. The method according to claim 2, WHEREIN the transmitting comprises using repetition or hopping over two slots of one physical uplink control channel subframe while making at least one many-to-one mapping of a multi-bit ACK/NACK control signal to a plurality of physical uplink control channel ACK/NACK constellation points.

7. The method according to claim 6, wherein a number of chunks that are allocated varies from subframe to subframe.

8. The method according to claim 6, wherein the apparatus comprises a mobile user equipment operating in a long term evolution-advanced (LTE-A) system in which the component carriers are aggregated to form a whole bandwidth of the LTE-A system.

9. An apparatus comprising:
    a receiver configured to receive data signals on more than one downlink shared channels using more than one chunks of downlink frequency spectrum; and
    a transmitter configured to transmit uplink multi-bit acknowledge/not-acknowledge feedback corresponding to the downlink shared channel of each of the chunks of downlink frequency spectrum, wherein a single uplink acknowledge/not-acknowledge channel resource on a single uplink component carrier at a time is used for the transmission of the multi-bit acknowledge/not-acknowledge feedback;
    wherein selection of the single acknowledge/not-acknowledge channel resource to be used, from a plurality of resources, is based on the multi-bit acknowledge/not-acknowledge feedback.

10. The apparatus according to claim 9, wherein the transmitter is configured to transmit the acknowledge/not-acknowledge (ACK/NACK) control signals on an uplink control channel, and
    wherein the uplink control channel is component carrier specific, is reserved from at least one uplink component carrier and corresponds to the chunk of downlink frequency spectrum, and each chunk comprises a component carrier.

11. The apparatus according to claim 9, wherein the receiver is configured to receive, on a downlink control channel, a downlink grant that comprises downlink assignment index bits, the downlink assignment index bits indicating how many in total are allocated in a current downlink subframe;
    wherein the transmitter is configured to transmit the uplink multi-bit acknowledge/not-acknowledge feedback in response to the data signals received on the downlink shared channel that is allocated to the apparatus by the downlink grant.

12. The apparatus according to claim 10, in which the transmitter is configured to perform at least one of:
    ACK/NACK control signal multiplexing including ACK/NACK control signal bundling over a spatial domain;
    ACK/NACK control signal bundling over a component carrier domain;
    utilizing all constellation points in two slots of one physical uplink control channel subframe for different transmitted ACK/NACK control signals; and
    using repetition or hopping over two slots of one physical uplink control channel subframe while making at least one many-to-one mapping of a multi-bit ACK/NACK control signal to a plurality of physical uplink control channel ACK/NACK constellation points.

13. The apparatus according to claim 12, in which a number of chunks that are allocated varies from subframe to subframe.

14. The apparatus according to claim 12, in which the apparatus comprises a mobile user equipment operating in a long term evolution-advanced (LTE-A) system in which the component carriers are aggregated to form a whole bandwidth of the LTE-A system.

15. A memory storing a program of computer-readable instructions which when executed by a processor cause the processor to perform actions comprising:
receiving data signals on more than one downlink shared channels using more than one chunks of downlink frequency spectrum; and
transmitting uplink multi-bit acknowledge/not-acknowledge feedback corresponding to the downlink shared channel of each of the received chunks of downlink frequency spectrum, wherein a single uplink acknowledge/not-acknowledge channel resource on a single uplink frequency spectrum at a time is used for the transmission of the multi-bit acknowledge/not-acknowledge feedback;
wherein selection of the single acknowledge/not-acknowledge channel resource to be used, from a plurality of resources, is based on the multi-bit acknowledge/not-acknowledge feedback.

16. The memory according to claim 15, wherein the acknowledge/not-acknowledge (ACK/NACK) control signals are transmitted on an uplink control channel,
wherein each uplink shared channel is component-carrier specific, is reserved from at least one uplink component carrier and corresponds to the chunk of downlink frequency spectrum, and each chunk comprises a component carrier.

17. The memory according to claim 16, wherein the processor and the memory are disposed in a mobile user equipment operating in a long term evolution-advanced (LTE-A) system in which the component carriers are aggregated to form a whole bandwidth of the LTE-A system.

* * * * *